United States Patent [19]

Häfner et al.

[11] Patent Number: 4,739,666

[45] Date of Patent: Apr. 26, 1988

[54] FLAT-SPREAD FORCE MEASURING DEVICE

[75] Inventors: Hans W. Häfner, Aichach-Walchshofen; Günther Bock, Friedberg, both of Fed. Rep. of Germany

[73] Assignee: Pfister GmbH, Augsburg, Fed. Rep. of Germany

[21] Appl. No.: 934,888

[22] Filed: Nov. 25, 1986

Related U.S. Application Data

[63] Continuation-in-part of Ser. No. 680,126, Dec. 10, 1984, Pat. No. 4,644,805, and a continuation-in-part of Ser. No. 907,771, Dec. 10, 1985.

[30] Foreign Application Priority Data

Dec. 10, 1984 [EP] European Pat. Off. ........ 84115029.5
Dec. 10, 1984 [DE] Fed. Rep. of Germany ....... 3444996
Jan. 24, 1986 [DE] Fed. Rep. of Germany ....... 3602073
Feb. 13, 1986 [DE] Fed. Rep. of Germany ....... 3604420

[51] Int. Cl.$^4$ .......................... G01L 1/16; G01L 7/08; G01L 9/08
[52] U.S. Cl. .................... 73/862.68; 29/454; 29/610 SG; 73/726; 73/754; 73/777; 73/DIG. 4
[58] Field of Search ........... 73/862.68, 862.65, 862.64, 73/862.38, DIG. 4, 768, 777, 754; 177/211, 210 R; 338/5, 2; 310/345; 29/454, 610 SG

[56] References Cited

U.S. PATENT DOCUMENTS

| | | | |
|---|---|---|---|
| 3,410,135 | 11/1968 | Reynaud | 73/862.38 |
| 4,175,429 | 11/1979 | Keck | 73/141 A |
| 4,644,805 | 2/1987 | Hafner | 73/862.68 |

Primary Examiner—Donald O. Woodiel
Attorney, Agent, or Firm—Armstrong, Nikaido, Marmelstein & Kubovcik

[57] ABSTRACT

A flat-spread force measuring apparatus comprising a stiff rigid main body having an essentially plane top surface for receiving a load; a plurality of flat cavities provided in said body spaced to each other and extending in parallel to said top surface; essentially bubble free elastomeric material contained in said cavities; a plurality of pressure sensors one each arranged in contact to said elastomeric material in each of said cavities; a plurality of force introduction members one each arranged in an essentially vertical alignment to said pressure sensors and below them; and evaluation means electrically connected to said pressure sensors for combining electrical signals received therefrom and representing local force components transmitted from said load receiving body through said elastomeric material to said pressure sensors.

28 Claims, 10 Drawing Sheets

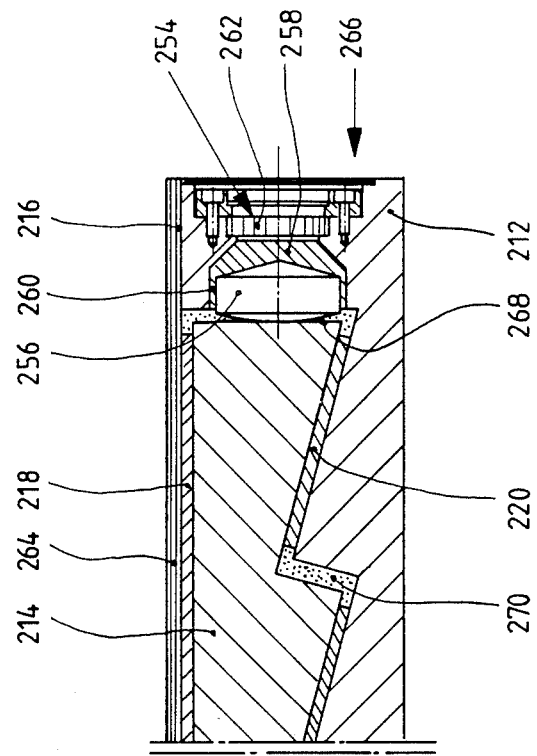

FLAT-SPREAD FORCE MEASURING DEVICE

This application is a continuation-in-part of application Ser. No. 680,126, now U.S. Pat. No. 4,644,805, filed Dec. 10, 1984 and application Ser. No. 907,771 filed Dec. 10, 1985.

TECHNICAL FIELD

The present invention relates to a flat-spread force measuring device and in particular to those devices and apparatuses adapted for weighing loads placed on such device or apparatus.

BACKGROUND ART

The U.S. Pat. No. 3,410,135 discloses a force measuring device where at the bottom of a potlike base member an elastomeric block is arranged having a slightly raised peripheral lip. A force introduction piston having a remarkably smaller diameter than the cylindrical interior of the base member fits with its lower face edge into the recess formed by the raised lip. The gap between the peripheral surface of the piston and the cylindrical inner surface of the base member is relatively large and of such a width that upon application of a force no elastomeric material is squeezed out of the base member by the piston. In view of the relatively large gap the piston may assume a certain oblique position with respect to the cylindrical interior on the base member without engaging the surface of the latter. In order to limit such an oblique position of the piston a resilient washer may be provided in the upper region of the annular gap between the piston and the interior surface of the base member. There is no connection between the elastomeric material and the metallic surfaces of the base member and the piston in contact with the elastic material. Without the washer considerable lateral forces will be transmitted to the elastomeric material and cause misreadings of the force measured. With the washer provided a new member of friction is introduced which in turn deteriorates the measuring results. Since the annular gap is relatively wide elastomeric material will be pressed into it at least upon application of large forces which gives rise to further inaccuracies of the measurement.

The U.S. Pat. No. 4,175,429 discloses a force measuring device comprising a pressure sensitive metal wire embedded in block of vulcanized silicon rubber provided at the bottom of a cylindrical recess in a base member and compressible by means of a movable piston acting as a force introduction member onto the silicon rubber. A considerable space is allowed between the interior cylindrical wall of the base member and the peripheral surface of the piston. In order that a clearance may be maintained as large as possible a sealing ring is provided at the edge of the lower face surface of the piston in contact with the silicon rubber. The sealing ring is in contact with the cylindrical surface of the interior of the base member which results in a considerable friction affecting the accuracy of the force measuring device. Furthermore, any lateral force component of a force applied at an oblique angle onto th force introduction members acts at least partially onto the elastomeric material which again deteriorates the accuracy of measurement.

The German Patent Publication No. 1,932,899 discloses a force measuring device comprising two flat elastic members and material of high electric resistance which is arranged in form of lines or areas between the elastic members. The material is subjected to mechanical strain only in normal direction to the layer and changes its resistance dependent on the mechanical strain. With the known force measuring device force introduction is difficult. Furthermore, the manufacture is complex and the measurement accuracy insufficient for many applications. Also, the known device is not adapted for measuring very high forces.

The German Patent Publication No. 3,011,266 discloses a pressure measuring device for arealike pressure distributions. The device comprises a mat of elastic material changing its electrical conductivity dependent on pressure exertion. On each main surface a pattern of electrodes is provided the two patterns crossing each other the points of crossing defining a measuring point; at each measuring point a metal plate is secured to the mat the size of the metal plate corresponding the overlying areas of the electrodes. The known device is not adapted for very large loads and the accuracy is low. There is little resistance against wear.

DISCLOSURE OF THE INVENTION

It is an object of the invention to provide a flat-spread force measuring device having a simple design and excellent operating parameters.

Another object of the present invention is to provide a flat-spread force measuring device which is insensitive to lateral force components whilst exactly measuring vertical force components asymetrically applied to the device.

Still another object of the present invention is to provide an improved method for manufacuring flat-spread force measuring devices.

These and other objects of the invention are achieved by the devices and methods as defined in the appended claims.

BRIEF DESCRIPTION OF THE DRAWINGS

FIGS. 14 to 17 show views of a further embodiment of a flat spread force measuring apparatus of a wedge type design.

DETAILED DESCRIPTION OF THE EMBODIMENTS

Figure 1:
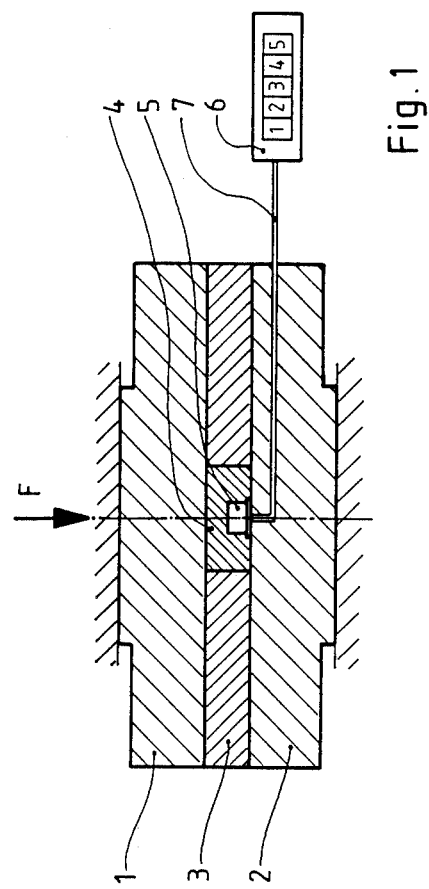
FIG. 1 shows the principle design of a force measuring device according to the invention in a vertical sectional view.
Figure 2:
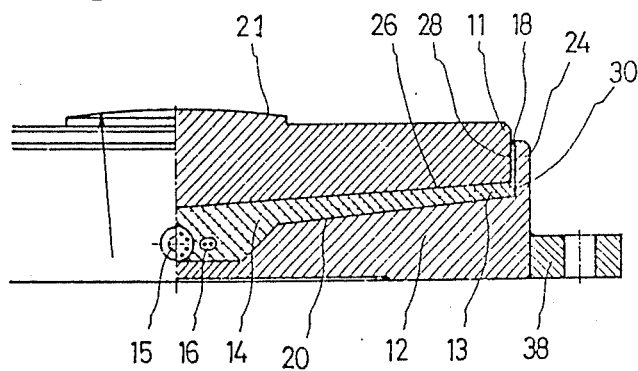
FIG. 2 is a side view partially in section illustrating a force measuring device produced with an apparatus according to FIG. 5.
Figure 3:
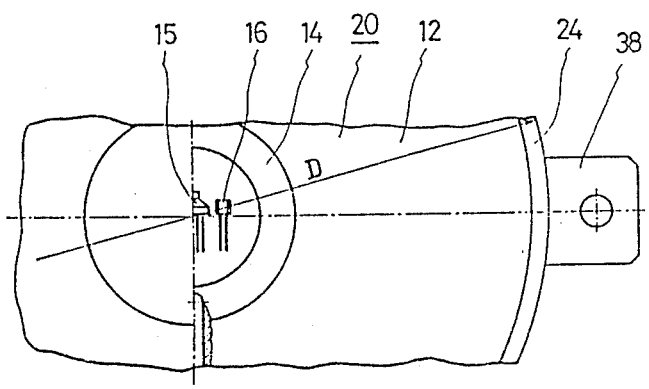
FIG. 3 is a top view of the force measuring device of FIG. 2.

FIG. 1 shows the principle design of a force measuring device according to the invention in a vertical sectional view and FIGS. 2 and 3 show a vertical sectional view and a plan view, respectively, of a force measuring device as designed for practical use.

According to FIG. 1 an elastomeric material 3 is arranged between two members 1, 2, opposite face surfaces of which are in parallel arrangement to each other. Basically no connection between the members 1, 2 and the elastomeric material 3 would be necessary since there is no sealing necessary. However, according to the invention the elastomeric material 3 is secured at the opposing face surfaces of the members 1, 2 either by an adhesive or by vulanization.

Within the elastomeric material there is provided a pressure sensor which, as an example, may be a piezoelectric or piezoresistive pressure transducer 5 which converts pressure into an electrical signal. The pressure transducer 5 is connected via an electrical conductor 7 to a pressure measuring and indicating apparatus 6. This apparatus may comprise a digital voltmeter which receives the force-proportional signal from the pressure transducer 5.

In one embodiment of the force measuring device according to the invention the piczoelectric pressure transducer 5 is embedded in a material 4 contained in a recess in the elastomeric material 3 and which has a higher viscosity than the latter material.

The material 4 may be a gel like silicon. If a force F is exerted normal onto force introduction member 1 preferably consisting of metal, such a force is transferred to the elastomeric material 3 which transmits this force to the piezoelectric pressure transducer 5 in a pressure proportional manner.

The piezoelectric pressure transducer may be replaced by a strain measuring gauge connected in a Wheatstone bridge or any other appropriate pressure sensor.

Alternatively, the pressure exerted to the elastomeric material 3 may be transferred to a corresponding measuring and indicating apparatus by filling the recess in the elastomeric material 3 with a liquid and having this liquid exerting the pressure via a liquid lead 7 directly to the measuring and indicating apparatus which then provides a direct hydraulic indication.

In situations where forces are exerted non-uniformly onto the upper surface member 1, several pressure transducers may be distributed in the elastomeric material 3. The members 1 and 2 or at least member 1 may have then a considerable surface, for instance in accordance with the dimensions of a truck. The pressure transducers would then be distributed in a matrix array over such a force measuring carpet. The signals derived from the pressure transducers will then be supplied to an evaluation apparatus which calculates the exerted total force and indicates the latter.

Particular fields of application of the force measuring device according to the invention are measuring the weight of very large containers or the load exerted onto the wheel or axle of a truck or other vehicle.

A practical embodiment of a force mesuring device manufactured according to the method of the invention is shown in FIGS. 2 and 3. Between an upper member 11 and a base member 12 there is provided elastomeric material 13 into which a pressure transducer or sensor 15 and associated resistors 16 for temperature compensation are embedded. By means of a flange 38 the base member 12 may be secured to a base or support (not shown) whilst the force is exerted to the upper surface of the upper member 11 which may be provided with a spherical region 21.

According to this embodiment the region formed between the two opposing inner surfaces of the members 11 and 12 has a more specific form. In particular, the lower surface 26 of the upper member 11 has a slightly convex or conical shape. The upper surface 20 of the base member 12 may be formed convex resulting in a flat cup-like form. A broadened recessed central region 14 serves for the arrangement of the pressure sensor 15 and the compression resistors 16. Furthermore, the base member 12 is provided with an upwardly extending peripheral rim 24 for insertion of the upper plate 11. The dimensions are such that between the outer peripheral surface 28 of the upper member 11 and the cylindrical inner surface 30 of the rim 24, there is only a very narrow circular gap 18 which in accordance with the dimensions of the embodiment shown in FIGS. 2 and 3 is in the order of 0.1 to 2 mm preferable in the region between 0.2 and 1 mm. The narrow gap width has the advantage that the force measuring device has a high rigidity resulting in a rapidly dampening of osicillations. Also, the temperature sensitivity is reduced.

For optimizing the operation of the force measuring device, according to the invention, the height of the gap 18 may be of importance. This gap height should not be too small since via the two opposing surfaces 28 and 30 often considerable lateral forces will have to be transmitted.

By optimizing the gap 18 of the influence of the temperature dependent spring characteristic of the silicone rubber may be minimized by a simultaneous reduction of measurement deflection which may be in the order of 0.01 mm. Also, a high stability against lateral forces is achieved.

By designing the upper member 11 in the form of a swimming body the effect of self alignment upon asymmetric loading is enhanced. With a force measuring device having dimensions as shown in FIG. 2, the height of the gap 18 may be in the order of 10 to 30 mm, preferably between 15 and 20 mm. The dimensions of the members 11 and 12 and the interspace between them filled with the elastomeric material are considered to be the dimensions of a preferred embodiment and these dimensions are made part of the description whilst deviations from these dimensions are in the option of a person skilled in the art.

With the embodiment according to FIGS. 2 and 3 as a pressure sensor an absolute pressure sensor is used, for instance the absolute pressure sensor KPY 14 manufactured by Siemens AG, Munich (FRG). This absolute pressure sensor 15 is embedded in the elastomeric material 13 in such a manner that there is no essential contact of the absolute pressure sensor 15 to either of the members 11 and 12. This results in a uniform pressure distribution and a good protection of the absolute pressure sensor, the compensation resistors and the cable against environmental influences in particular against penetration of gases and humidity. Thus, such a force measuring device may be used in an underwater environment.

As elastomeric materials 13 natural or synthetic materials may be used with a shore hardness in the range between 30 and 70 preferably 40 and 60. As an example for an elastomeric material 13 the silicone-rubber RTV-ME 625 of Wacker-Chemie AG, Munich (FRG) may be used.

A high uniformity and incompressibility of the elastomeric material are achieved in that air and gas bubbles are removed from the elastomeric material before or during the hardening thereof by the procedure according to the invention.

Figure 5:
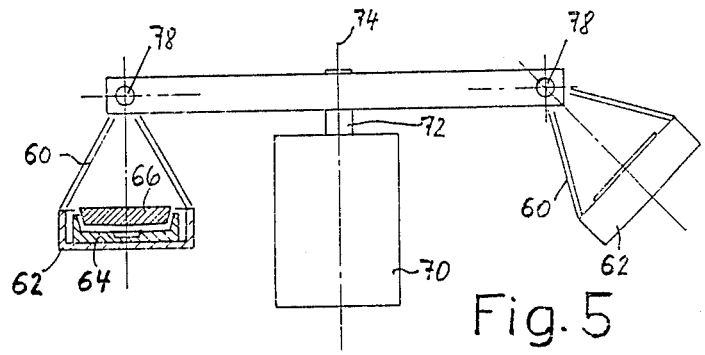

FIG. 5 is a sideview of an exemplary embodiment of the apparatus according to the invention showing to the left the apparatus in rest position and to the right in operating position.

It should be noted that for implementing the procedure according to the invention various apparatuses could be used adapted to apply a sufficient acceleration for sufficient time to the synthetic material. Accordingly, the apparatus according to FIG. 5 is an exemplary preferred design just shown in principle.

FIG. 5 shows a motor 70 which is adapted to rotate its shaft 72 about a vertical axis 74. For the present embodiment the shaft 72 supports at a central position a horizontal beam 76. In principle a one-arm-arrangement would be sufficient or for mass production a carrousel type of apparatus having a plurality of starlike arranged beams may be used. At the ends of the beam 76 support members 62 are fixed at pivotal points 78 by means of wires, cords or rigid connection bars like an apothecaries' scale. The support members 62 may comprise moulds for one or several of the synthetic bodies to be fabricated or may consist of a plate for putting one or several moulds 64 onto it which are filled with the synthetic resin.

Upon energisation of the motor 70 the rotation of its shaft 72 causes the support members 62 to pivote from the rest position shown on the left hand side of FIG. 5 into a position exemplary shown on right hand side of FIG. 5. With increasing rotational speed the support members 62 are lifted more and more in view of the resultant of gravitation and centrifugal force.

Preferably, this centrifugal procedure is initiated soon after mixing of the two or several components of the synthetic material together and filling the mixture into the mould. Thus, the mixture is more or less in liquid form and the pressure created in the mixture presses the essentially lighter air bubbles out of the synthetic material and the mould.

Dependent on the material and the progress of the hardening accelerations of a multiple of g (acceleration of gravity) up to 100 may be applied to the material. The desired accelerations may be calculated on the basis of the rotational speed and the dimensions of the beam 75 and the cords 60. Alternatively the angular position of the support members 62 in respect of the horizontal direction at predetermined rotational speeds in test runs may be used for determining the acceleration.

As mentioned before the duration of the centrifugal process may be determined by means of simple test runs.

The effect of the centrifugal process may be improved by covering the mould 64 or the moulds on the support member 62 by placing a top member onto the material which esentially covers the material whilst bubbles may be pressed out through a gap consisting between the rim of the mould and the peripheral edge of the top member 66.

With the apparatus according to this embodiment a force measuring device may be fabricated including a base member 64 provided with an upward projecting rim. The synthetic material to be hardened is exemplary silicon - rubber, RTV-ME 6 25 of Wacker Chemie AG München (FRG). After pouring the mixture consisting of the base material and a hardening agent into the base part 64 acting as the bottom mould part, the top plate 66 is inserted which leaves a gap between the rim of the base part 64 and the peripheral surface of the top part 66. With an acceleration between 30 and 60 x g all air bubbles are pressed out of the elastomeric material in a vary short time between several seconds and one minute.

If a mould is used which is essentially closed it will be preferably to provide an air escape opening. Alternativly the most upper layer of the material may be removed for instance cut away or ground away which layer will include all air bubbles in case the air is not completely accumulated above the synthetic material.

It should be noted that with such a centrifugal process also other particles having a density different from that of the synthetic material may be removed such that the resulting body will be extremely pure and uniform. Heavier particles would be forced to the bottom of the mould and can be removed there by removing the bottom layer of the body.

After the centrifugal process the material may complete hardening in rest in case the hardening is not yet completed during the centrifugal process. It should be noted, that the hardening may be enhanced by putting the moulds with the reacting mixture into an oven for applying an increased temperature. In addition, during rotation heeting could be applied to the mould(s) if desired as explained in No. DE-Al-25 37 262.

For producing force measuring devices according to FIGS. 2 and 3 the method explained before is applied as follows:

In view of the cuplike form the base member 12 may be used as the mould for the elastomeric material which considerably simplifies the production of the force measuring devices. First, the two (or more) reactant components of the elastomeric material are mixed by stirring in a well-known manner and a proper quantity of the mixture is poured into the base member 12 upon having arranged the pressure sensor 15 and the compensation resistors 16 in the latter. The base member is now placed onto the apparatus of FIG. 5 and rotated with a predetermined rotational speed for a predetermined time. The rotational speed and the time may be selected such that all air or gas bubbles are squeezed out of the reacting mixture. The two parameters will further depend on the type of elastomeric material used and at what time after initiating hardening of the mixture has elapsed; a typical rational speed might be in the order of 50 to 500 rpm., preferably between 150 and 400 rpm.. The time period may vary between several seconds and several minutes, preferbly in the range about one minute.

Although such a centrifugal process may be accomplished without placing the upper member 11 onto the base member 12 such a measure supports the pressure onto the elastic material resulting in a faster removal of air or gas bubbles which removal is further enhanced by the above mentioned convex shape of the lower surface of the upper member 11. Furthermore, with the upper member 11 in inserted position the force measuring device is already completed in its final form with the hardening mixture of the elastomeric material completely filling the gap between the upper member 11 and the base member 12.

An improved force measuring cell results from wetting all parts of the upper member and the base member coming into contact with the elastomeric material with an agent containing in a solvent, for instance aceton or toluene, silanes or silicon resines. Such a primer, exemplary primer G 790 manufactured by Wacker-Chemie GmbH Munich (FRG) ensures that the elastomeric material fixedly adheres to the metallic surfaces of the upper member and the base member. As a result, there is no danger of penetration of humidity or dirt and lateral forces acting on the upper member are transferred to the base member through the elastomeric material in the gap without friction.

Figure 4:
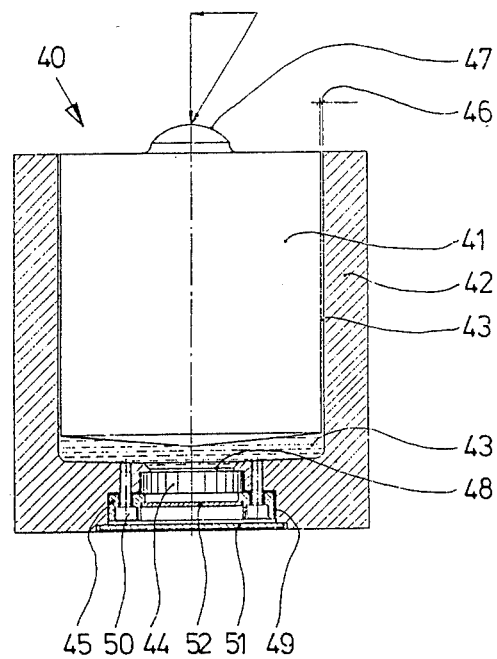
FIG. 4 is a side view partially in section of a second embodiment of a force measuring device produced in accordance with the method of the invention, and FIG. 5 a schematic diagram of an apparatus used for producing force measuring devices according to the invention.

FIG. 4 shows a further embodiment of a force measuring device preferably produced by using the method according to the invention. In FIG. 4 load cell 40 includes a potlike base member 42 having a relatively high cylindric side wall. In the interior of the base member 42 a force introduction member specifically a force transmission piston 41 is provided at the upper face of which a spheric section may be provided for force introduction. The lower face of the piston 41 may be formed slightly convex or conical for enhancing removement of air bubbles when applying the method according to the invention. Between the lower face of the piston 41 and bottom of the base member 42 elastomeric material 43 is shown which preferably is a silicon rubber, exemplary RTV-ME 6 25 or RTV-ME 6 22 manufactured by the Wacker-Chemie GmbH Munich (FRG). Alternatively, any other elastomeric material mentioned before may be used. Silicon rubbers are preferred in view of their exellent temperature constancy in a range between −100° C. bis +200° C. Furthermore, they are resistant against ozone and light influence as well as against oil.

In the bottom wall of the base member 42 there is at least one opening preferably a central opening 48 into which a pressure sensor 44 may be inserted and fixed by means of a ring 45. Specifically, after inserting the pressure 44 from below the ring 44 is placed into a recess 49 at the bottom face surface of the base member 42 and exemplary fixed by means of screws 50 at the bottom wall of the base member 42. Finally, a cover plate 51 is bonded or otherwise fixed at the bottom face surface for an air and humidity tight connection.

One of the salient features of the embodiment of FIG. 4 is the relatively narrow and extremely high gap 46 between the peripheral surface of the piston 41 and the interior surface of the base member 42. Preferably, this gap is in the range of 0.05 to 2 mm, preferably 0.1 to 1 mm whilst its height is in the range of the diameter of the piston 41.

Compared with the embodiment according to the FIGS. 2 and 3 the load cell 40 according to FIG. 4 is adapted for use in connection with forces which have considerable lateral components which with the embodiment according to FIGS. 2 and 3 will tend to tilt the upper member in an oblique position which might lead to the blocking of its movement in vertical direction or at least to considerble friction. Considering the load cell 40 according to FIG. 4 an oblique force acting upon piston 41 is divided in a force component acting in direction of the piston axis as a vertical component and into a force component acting perpendicularly to the verical component as a lateral force component. The latter is bypassed through the elastomeric material 43 in the gap 46 and the base member 42 into the base support (not shown). The vertical component causes the elastomeric material 43 below the lower face of the piston 41 a pressure proportional to the vertical component, which pressure is captured by the pressure sensor 44.

The high, narrow gap 46 has the further advantage of an increased rigidity in load direction (smaller 0.01 mm) and offers the use of load cells 40 for extreme loads in the range of 1000 tons and more and an interior pressure up to 500 bars. The load cells 40 have a very compact size. For producing load cells 40 according to the method of the invention first all metallic surfaces of the base member 42 and the piston 41 which will come into contact with the elastomeric material 43 will be treated with an adhereing agent as explained in connection with the embodiment of FIGS. 2 and 3 in order to ensure a definite connection of the elastomeric material 43, in particular in the gap 46, to the surfaces of the piston the base member 42.

The opening 48 in the bottom wall of the base member 42 may be closed by the inserted pressure sensor 44 or by a plate of similar size. As described before a mixture of two (or more) reactant components of the elastomeric material are mixed together and a proper amount of the mixture is poured into the interior of the base member 42. For removing all air bubbles the device is placed onto the apparatus of FIG. 1 and rotated for a time period which might even be below one minute with a rotational speed of exemplary 300 rpms. assuming that the device is arranged at a distance from the rotational axis of about 500 mms. Upon stopping the apparatus piston 41 is inserted and there is a second centrifugal step similar to the first step removing the rest of air bubbles and having the elastomeric material 43 rising into the narrow gap 46 up to the upper edge of the base member 42. Such the gap 46 will be completely filled with the elastomeric material 43 which will fixedly adhere to the surfaces of the piston 41 and the base member 42 due to the primer treatment mentioned before.

Alternatively, the two step procedure may be replaced by a one step procedure by inserting the piston 41 immediately after pouring the mixture into the interior of the base member 42. Thus, only one centrifugal step is necessary. After this one centrifugal step or after the second step the device is maintained in rest for completing hardening (provided that the hardening has not yet been finished during the centrifugal step (s)).

Now, if the pressure sensor 44 was not placed into the opening 48 at the beginning of the process, the plate closing this opening is removed and a pressure sensor 44 is inserted which has been calibrated and compensated separately from the load cell 40.

It should be noted, that this feature of a separately and replaceably attaching of the pressure sensor 44 to the load cell 40 is of considerable advantage since the pressure sensor 44 may be calibrated and compensated by the corresponding compensating resistors separately and individually without using the load cell 40. Electrical parts necessary, in particular the compensating resistors may be applied to a board 52 arranged below the pressure sensor 44 or to the bottom face surface of the pressure sensor 44 by a conventional thick layer technique. Alternatively, an intelligent pressure sensor might be used having integrated calibration and compensation means. Obviously, the pressure sensor 44 is connected by a cable (not shown) to appropriate evaluation means well-known in the art.

It should be appreciated that the embodiment according to FIG. 4 is the best mode for carrying out the invention in particular when vertical force components are to be measured of forces which act upon the force introducing member at an oblique angle to the vertical direction.

Whilst the method according to the invention is the best mode for producing the force measuring devices of the types described before other procedures for removing air bubbles from elastomeric material may be used as applying vacuum to the elastomeric material as it is known in the art.

Figure 6:
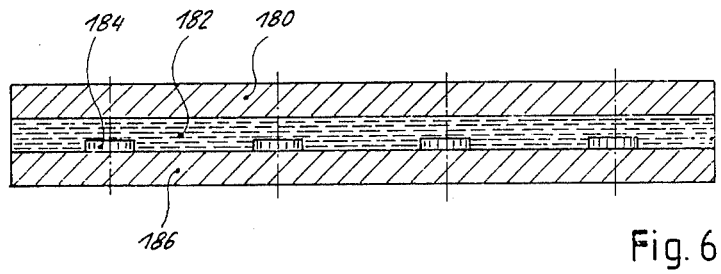
FIG. 6 is a schematic illustration of a first embodiment of a flat spread force measuring device according to the invention.

FIG. 6 shows the principal design of a flat-spread force measuring device according to the invention. Between a base plate 86 and a load introduction plate 80 a layer of elastomeric material 82 is provided which is in contact with a plurality of pressure sensors 84 uniformly distributed over the area of the device which may be rectangular or circular, as examples; it is of importance for the force measuring device according to the invention that the elastomeric material is essentially bubble-free such that any force exerted onto plate 80 is completely transmitted to pressure sensors 84. Furthermore, it is essential that the elastomeric material strongly adheres to the metal surfaces of plates 80 and 86. This prevents any remarkable squeezing-out of the material upon load application. With a very rigid and stiff load introduction plate 80 even a load which is non-uniformly distributed over the plate 80 will be measured by the device with a high accuracy by combining the force components measured by the various pressure sensors 84 in an evaluation device (not shown).

Figure 7:
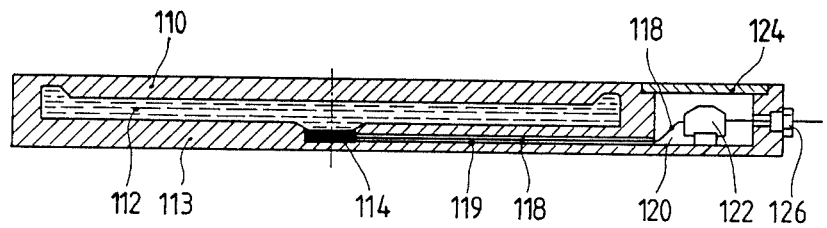
FIG. 7 is a cross-sectional side view of a second practical embodiment of a flat-spread force measuring device according to the invention.

FIG. 7 shows a flat-spread force measuring apparatus according to a practical embodiment of the invention. The apparatus comprises a housing 110 having integrated the force receiving member and the base member. Though the housing could be made of steel with the embodiment the housing 110 is made of a so-called "polymeric concrete", which is mixture of sand, quartz and a polymeric material which will be described in detail hereinafter.

The housing 110 has an esentially plane top surface for placing a subject onto it which is to be weighed. The housing 110 is extremely flat having a overall height in the range of a few centimeters only. Within the housing 110 there is a cavity 115 extending below the top surface of the housing with the exception of a peripheral side wall connecting the top part of the housing with a base part 113. The cavity 115 has a top surface and a bottom surface essentially parallel to each other and to the top surface 111. Whilst the housing may have any suitable form as a rectangular or a square-like form, with the embodiment a circular form is used. It should be noted that the cavity 115 is provided with a peripheral groove 117 at its top surface in order to give a certain resiliency to the top part of the housing.

According to the invention the cavity 115 is completely filled with elastomeric material 112 which exemplary may be a silicon rubber.

Preferably at a central location within the housing 110 the bottom surface of the cavity 115 is provided with an opening at which a pressure sensor 114 is arranged; connection wire 118 pass through a duct 119 extending from the pressure sensor 114 out of the housing 110 to an electrical device 122 for evaluating the electrical signals supplied from the pressure sensor 114. The electrical device 122 is located in a compartment 120 laterally attached to the housing and closed at the top side by a cover 124 which may be transparent permitting sight to an illuminated indicator provided by the electrical device 122. Through a connector 126 an electrical signal may be transferred to an external evaluation means (not shown).

In operation, a load is placed on the top surface 111 of the housing 110 the force applied thereto being completely transmitted through the elastomeric material 112 to the pressure sensor 114 generating electrical signals representing the load for evaluation and/or indication by the electrical device 122.

It should be noted that the compartment 120 may be unitary to the housing 110. Also, the electrical device 122 may be moulded together with the moulding of the housing. Also, the connector 126 may be integrated into the wall of the housing during moulding.

The force measuring apparatus according to FIG. 7 will have a reasonable accuracy when a load is placed relatively symmetrical onto the top surface 111 of the housing 110. Thus, such an appartaus may be used as a bath room scales or a grocery scale.

Figure 8:
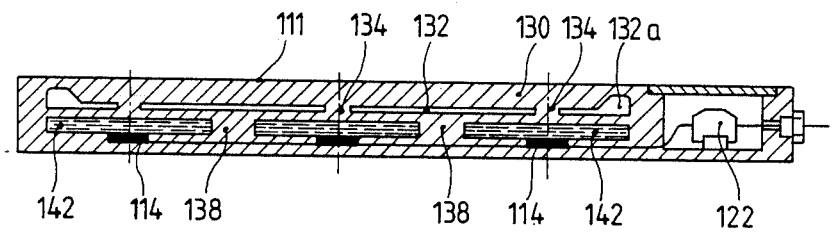
FIGS. 8 to 10 show cross-sectional side views of three further embodiments of flat-spread force measuring devices according to the invention, using a "polymeric concrete" as a basic material for the housing.

FIG. 8 shows a further embodiment of a flat-spread force measuring apparatus having improved accuracy even for loads asymmetrically placed on the top surface 111 of a housing 130. For this purpose, within the unitary housing 130 several pressure sensors 114 are arranged in spaced relationship to each other, the force receiving top surface of the pressure sensors 114 being in contact with elastomeric material 142 enclosed in separate cavities 145 of limited two-dimensional extension. As with the embodiment of FIG. 7 the housing 130 of the present embodiment may be made of "polymeric concrete". The pressure sensors 114 are commonly connected to the electrical device 122. Between the upper part 111 of the housing and the cavities 145 horizontal gaps 132 are provided which may be broadened at the periphery in order to form a peripheral recess 132a similar to the recess 117, however not filled with elastomeric material. The gaps 132 are interrupted in regions 134 located vertically above the pressure sensors 114 such that posts are formed directly transmitting any forces applied to the top surface 111, to the elastomeric material 142 and the pressure sensors 114. On the other hand, regions 138 located horizontally between the cavities 145 improve the rigidity of the base of the housing 130.

In operation, a load placed on the top surface 111 exerts forces thereon which are transmitted to the pressure sensors 114. The horizontal parts of the upper part of the housing 113 located above the gaps 132 act as a kind of beam transmitting forces received to the posts formed in the regions 134.

Figure 9:
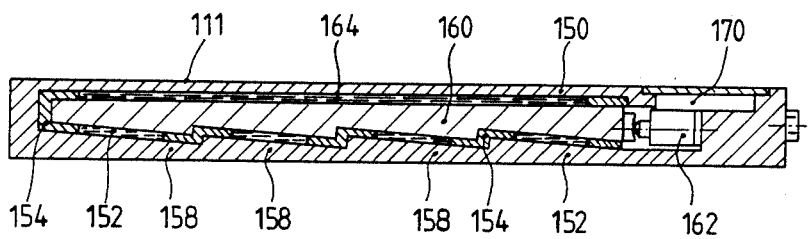

With the embodiment of FIG. 9 a force exerted onto the top surface 111 of the flat-spread force measuring apparatus is transferred to force measuring elements 162 arranged at distance to each other vertical to the plane of the drawing by means of a wedge type member 160. Again the unitary housing may be made of "polymeric concrete" whilst the wedge type member 160 may also be made of polymeric concrete or metal, in particular stainless steel.

With this embodiment the bottom surface of the cavity is provided with wedgelike ledges 58 parallel to each other opposing similarly inclined surfaces of the wedge type member 60. Between the plane top surface of the wedge type member 60 and the inner top surface of the housing 150 a gap is provided the major part thereof being filled with elastomeric material 164. Similarly, elastomeric material 155 is provided in the sawtooth type gap between the lower surface of the wedge type member 116 and the inner bottom surface of the housing 115. It should be noted that the elastomeric material 164 and 152 respectively, does not completely fill the gaps. Rather at the peripheral margin and at the regions at the steep edges of the saw teeth there are free spaces preferably filled with a light synthetic foam material.

One or more force measuring elements 162 are arranged in a compartment 70 unitary to the housing 150. Further details of embodiments of the wedge type will be explained hereinafter.

For manufacturing a force measuring apparatus as shown in FIGS. 7 and 8 first a body may be cast or moulded by polymerizing a mixture of the basic components of the elastomeric material 112 or 142, respectively. Again, a method should be used by which a bubblefree material is produced, as explained before. The body such made of elastomeric material is then placed into a mould complementary to the exterior shape of the housing 110 or 130, respectively. The pressure sensor(s) 114 are placed into the mould as well. If desired, reinforcement means as grids or rods consisting of synthetic material or steel may be arranged in the mould. For forming the gaps 132 and 132a, respectively, metal strips coated with anti-adhereing substances may be placed into the mould. Alternatively, to form these gaps synthetic foam material may be used which is left in the gaps or is rinsed out after moulding of the housing 130. Also, the lead 118 and, if desired, the connector 126 and the electrical device 122 may be placed into the mould for casting-in. Now the reacting mixture for the "polymeric concrete" is filled into the mould. After a short period of time, exemplary 30 minutes, the final force measuring apparatus may be recovered from the mould. The metal strips for the gaps 132, 132e are removed.

Alternatively, the housing 110 or 130, respectively may be formed layer by layer. First the base part is formed using a respective mould into which filling bodies corresponding to the bodies of the elastomeric material 112, 142 and the pressure sensors 14 are placed. After moulding the base part the filling body is removed and the elastomeric material is filled in using the base part as a mould as explained in connection with the method of the invention. Only after this step the top part of the housing 110, 130 is moulded.

In respect of the embodiment of FIG. 9 first the housing 115 and the wedge member 160 are moulded separately followed by the filling-in of the foam material 154 and the reacting elastomeric material 152 which is then hardened during applying vacuum in order to remove aire bubbles from the hardening elastomeric material. Alternatively, the wedge member 160 may first be provided with layers 152, 154 and then placed into a mould for casting the housing 150 in a manner as explained above.

The material, called "polymeric concrete" is a mixture using for polymerisation synthetic materials as epoxy resines, methyl-metacrylate resines or polyester resines. Filling materials are sand, quartz powder or ground granite. Furthermore, glas or preferably carbon fibres may be used. Other filling materials may be used as far as they are dry and do not react with the resines used. Mixtures which may be used are sold by KID Imprägniertechnik GmbH, Georgenstrasse 8, Grafing West Germany. The material used harden without heat application. The hardening process is initiated by suitable agents and is completed in a period of a few mintues up to several hours. All measures known in the field of moulding may be applied with the additional advantage that high temperatures need not to be considered.

It should be noted that it is an important aspect of the present invention that the elastomeric material is completely enclosed hermetically and pressure-tight the housing acting as a diaphragm. In view of the extremely small measuring displacements in the order of tens of micrometers the accuracy is high.

It should be noted that for embodiments using completely closed cavities for the elastomeric material the latter may be replaced by an incompressible liquid. For removing air bubbles from the elastomeric material and the "polymeric concrete" the mould may be subjected to high centrifugal forces or vaccum as explained before.

Figure 10:
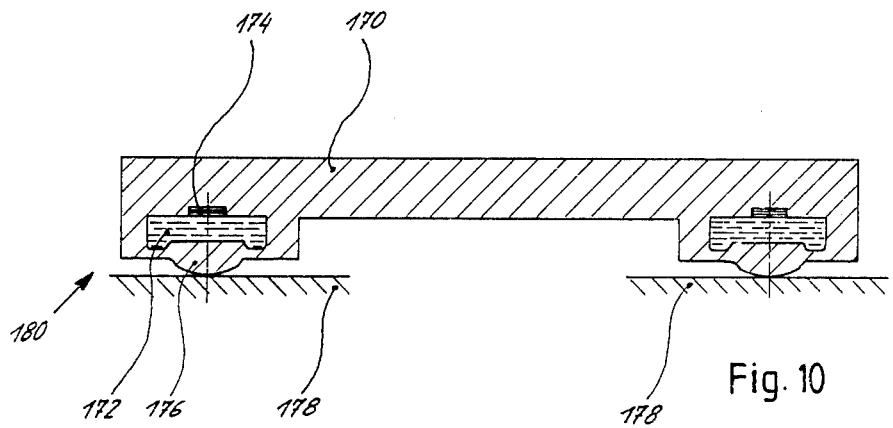

FIG. 10 shows an embodiment of a flat-spread force measuring apparatus comprising a platform 117 consisting of "polymeric concrete". The platform having a plane surface is supported through force measuring devices 174, elastomeric material 172 and a force introduction element exemplary a spheric projection 176 at a base 178. Using a rectangular shape such type of posts 180 may be provided at each corner of the platform 170. Using a circular shape at least three of such posts 180 are distributed around the periphery.

As shown in FIG. 10 a relatively broad, flat cavity is filled with elastomeric material 172 which is in contact with the pressure sensor 174. Again, the total arrangement is moulded unitary in a manner as explained before in connection with FIGS. 7 and 8.

As a modification of the embodiment of FIG. 10 a force measuring device similar to that of FIGS. 1 to 4 may be used in place of the posts 80.

Figure 11:
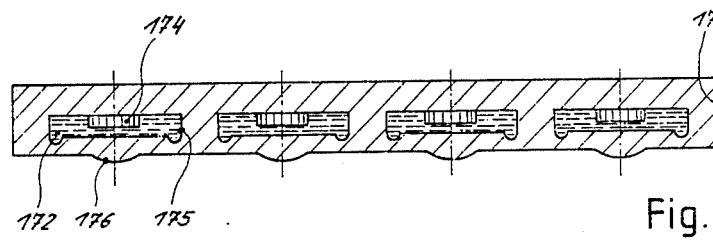

FIG. 11 illustrates an embodiment of flat-spread force measuring apparatus which is a modification of the embodiment of FIG. 10 and uses force measuring devices as a generally referred to as posts 180 in FIG. 10 evenly distributed over the area of the apparatus.

Again each post is designed, in principle, as the device according to FIG. 7 a pressure sensor 174 being arranged in contact with elastomeric material 172 filled in a flat cavity 175. It should be noted that with this embodiment the apparatus has a relatively rigid top part having a plane top surface whilst the bottom surface is provided with projections 176 arranged below the elastomeric material 172 and the pressure sensors 174, respectively which projections 176 make pointlike contact to any suitable plane base. Those regions of the housing 171 located below the cavities 175 act as a kind of diaphragm for transmitting supporting forces onto the elastomeric material 172 and the pressure sensors 174, respectively. As compared with the embodiment of FIG. 7 it will appreciated that, looking in a vertical direction, the arrangement of the various elements is just the other way around.

Figure 12:
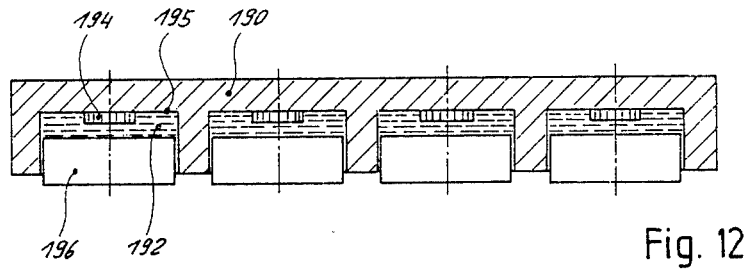
FIGS. 11 to 13 show further embodiments of flat-spread force measuring apparatuses of the invention having a defined force introduction from the bottom side of the devices.

FIG. 12 shows a further embodiment of a flat-spread force measuring apparatus using a housing 190 preferably made of "polymeric concrete" having a plane rigid top part, similar to that of the embodiment of FIG. 11. The force measuring device 172 to 176 of FIG. 11 is replaced by a force measuring device each similar to that of FIGS. 2, 3 or 4, respectively. Specifically a piston 192 is inserted into a recess 195 filled with elastomeric material 192 in contact with a pressure sensor 194. As explained in connection with FIGS. 2 to 4 the narrow annular gap between the cylindrical surfaces of the piston 192 and the recess formed in the housing 119 is filled with elastomeric material. The embodiment of FIG. 12 offers the same advantages as the embodiment of FIG. 11 having a rigid plane top part for receiving heavy loads which are measured on the basis of the supporting forces exerted onto the pistons 192. Even with a non-uniform loading of the platform the accuracy of measurement is excellent.

Figure 13:
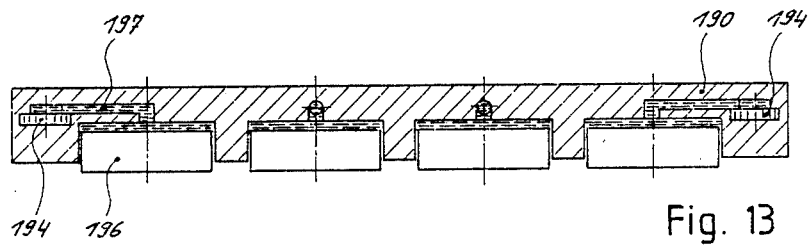

FIG. 13 shows a modification of the embodiment of FIG. 12 permitting a further reduction of the overall height of the flat-spread force measuring apparatus. With this embodiment the space of the recesses 195 is reduced and the pressure sensors 194 are arranged in peripheral regions of the housing 190 at a vertical position which is in the level of the piston 192. The pressure sensors 194 are in pressure contact with the elastomeric material 192 in the recess 195 through a duct 197 which may even be connected sidewards of the recess 195. As indicated in FIG. 13 the pressure sensors 194 may be arranged in peripheral regions at all four sides of a rectangular apparatus.

It should be noted that the pistons 196 of the embodiments of FIG. 12 and 13 may be provided with spherical projections 176 according to FIG. 11 to get a point-like support on a plane base.

Figure 14:
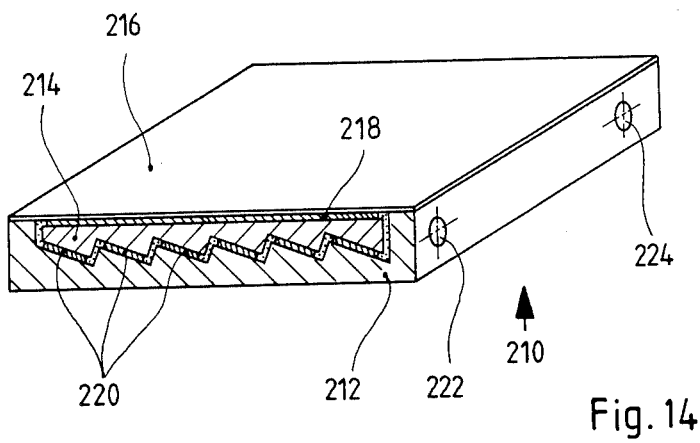

FIG. 14 shows an embodiment of a flat-spread force measuring apparatus of a wedge-type foam similar to that of FIG. 9. This force measuring apparatus 210 includes a very flat base member 212 preferably made of metal, as steel or "polymeric concrete". Over a major area of the base member 12 the latter is provided with a recess which is covered by relatively thin plate 216 made of steel. The bottom of the reces 213 (FIG. 15) is formed with wedge-type ledges parallel to each other. Thus, in a vertical section as shown in FIG. 14 the bottom has a saw tooth-like form with steep leading edges and smooth trailing edges.

Within the recess 213 there is provided a wedge member 214 the lower side of which has a shape complementary to the bottom of the recess 213.

Similar to the embodiment of FIG. 9 a relatively thin layer of elastomeric material is provided between the plate 216 and the plane top surface of the wedge member 214. With the exception of a small peripheral region the total area is covered by this elastomeric material 218. Layers 220 of similar elastomeric material are provided between the smooth trailing surfaces of the recess 213 and those of the wedge member 214. (see also FIG. 17). It should be noted that the steep leading surfaces are not covered by elastomeric material. Thus, free spaces are formed there between the base member and the wedge member 214.

Force measuring elements 234 (FIGS. 15 and 16) are inserted into openings 222, 224.

In operation, a load placed on plate 216 exerts forces through the elastomeric material onto the wedge member 214 which is urged in FIG. 14 to the right pressing agianst the force measuring elements inserted in the openings 222, 224.

Figures 15, 16:
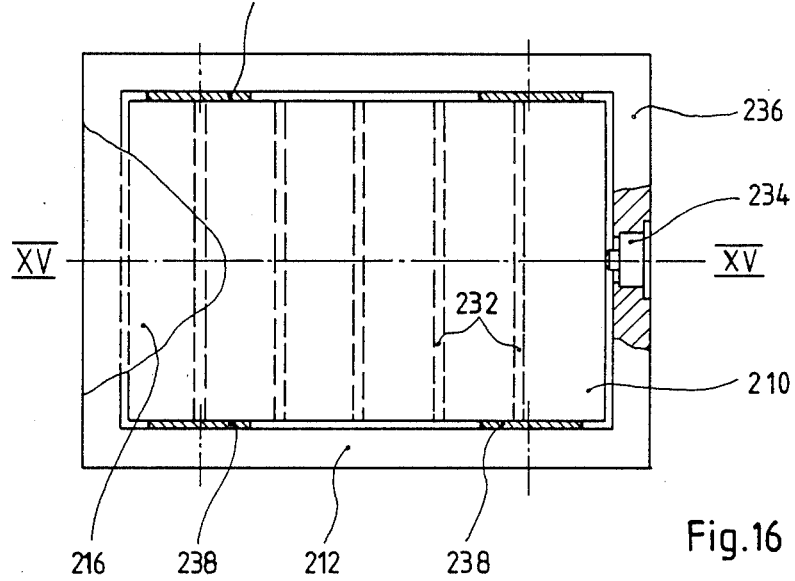

FIGS. 15 and 16 show in more detail the embodiment of FIG. 14 the embodiment having a rectangular shape. Ledges 232 extend in parallel to each other in lateral direction. A force exerted onto the plate 216 causes a horizontal force component acting onto the wedge member 214, which presses against a force measuring element 234 provided in an opening provided in a side wall 236, as seen in FIGS. 15 and 16. It should be noted that this side wall 236 is of very low height and the force measuring element 234 is arranged in alignment with a longitudinal centre axis II—II of the apparatus. It should be noted that a force element having a pull response could be arranged in the side wall opposite to the side wall 36 alternatively or in addition to the force measuring element 234.

When using only one force measuring element, preferably the wedge member 214 is guided in parallel by layers 238 provided at the lateral face surfaces of the wedge member 214 and the interior longitudinal surfaces of the base member 212.

It should further be noted, that the plate 216 is secured to the base member 212 at least in the direction of the minute movement of the wedge member 214 in order to transfer any horizontal component of the force applied to the plate 216 is directly transferred to the base member 212 and does not influence the measuring result.

As indicated in FIG. 14 two or more force measuring elements may be arranged in the side wall 236 (FIG. 16) of the base member 212. This is desirable in particular in those cases where the ledges 232 extend in the greater dimension, i.e. lengthwise rather than lateral as shown in FIG. 16.

FIG. 17 illustrate in more detail the design and arrangement of a force measuring device 254 used in connection with this embodiment. In principle, the design corresponds to the design of the force measuring devices explained in connection with FIGS. 2 to 4. Specifically, a generally cylindrical opening 260 is formed in the side wall of the base member 212; thus the force measuring device is completely integrated into the side wall. A force introduction piston 256 is fitted into the opening 60 forming a very narrow annular gap between the cylindrical surfaces of the pistons 256 and the opening 260. At the bottom of the opening 60 there is arranged a pressure sensor 262 which may be of piezo-electric or piezo-resistive type. In the opening 260 the space between the force introduction piston 256 and the pressure sensor 262 as well as the narrow gap is filled with bubblefree elastomeric material 258. The pressure sensor 262 may be inserted and exchanged through an opening 266 after removal of a cover plate 64, all this arrangement being similar to that described in connection with the embodiment of FIG. 4.

FIG. 17 shows in more detail the wedge member 214 urging with its face 268 to the force introduction piston 256. Plate 216 is shown in engagement with the top surface of the side wall of the base member 212, the plate 216 being secured thereto by bonding or screws (not shown).

Further, FIG. 17 shows in more detail the free space at the steep leading surfaces of the bottom surface of the recess provided in the base member 212 which may be filled by synthetic foam material 70. Preferably, pressure sensors are used which have a minimum displacement exemplary in the range of less than 1 mms. Thus, the tensional constant of the elastomeric material which has certain temperature dependency does not influence the the measurement.

Since the elastomeric layers are relatively thin exemplary in the range of 0.2 to 0.3 mms they have little contribution to the overall height of the apparatus and there is no danger of a laterally squeezing out of the material.

The flat-spread force measuring apparatus according to the embodiment of FIGS. 14 to 17 may have many applications as bath room scales, truck scales or bin or bunker weighing device. In view of the very low weight of the apparatus it is easily transportable. No rigidity of base member is necessary since it is assumed that the apparatus is placed on a plane base as a road or the ground of a room. Since the plate 216 is secured to the base member 212 the force measuring device is hermetically sealed. The flat elements 212, 214 and 216 have an extremely low thickness such that the overall height is in the range of 5 to 50 mms.

As a further integration the force introduction piston 256 may be made integral to the wedge member 214.

The manufacture of the apparatus according to the this embodiment may correspond to that of the devices explained before.

In the preceding description flat spread force measuring devices and apparatuses have been disclosed which are particularly simple in design, flat in their overall-heights and of excellent accuracy. The use of bubble-free elastomeric material ensures a complete transmission of the forces introduced to the force measuring device to the pressure sensors there is a reduction in weight of the devices by using "polymere concrete". Manufacturing costs are reduced by the easy manufacture of the devices and apparatuses by moulding of the elements at ambient temperatures. Using spheric projections having pointlike contact to a plane base as a street or ground surface ensures a defined load introduction. The design of a wedge-type force measuring apparatus reduces the number of force measuring devices necessary.

We claim:

1. A flat spread force measuring apparatus comprising:
   a stiff rigid main body having an essentially plane top surface for receiving a load;
   a plurality of flat cavities provided in said body spaced from each other and extending in parallel to said top surface;
   essentially bubblefree elastomeric material contained in said cavities;
   a plurality of pressure sensors one each arranged in contact with said elastomeric material in each of said cavities;
   a plurality of force introduction means one each arranged in an essentially vertical alignment to said pressure sensors and below them; and
   evaluation means electrically connected to said pressure sensors for combining electrical signals received therefrom and representing local force components transmitted from said load receiving means through said elastomeric material to said pressure sensors.

2. The force measuring apparatus of claim 1 wherein said force introduction means are regions of a bottom surface of said body defining a type of diaphragm below each cavity and being provided at their lower side with a projection each for pointlike support of said force measuring apparatus.

3. The force measuring apparatus of claim 1 wherein said force introduction means are a piston each inserted in a cylindrical recess an inner face surface of said piston forming a wall of said cavity, a narrow gap being formed between cylindrical surfaces of said piston and said recess filled with elastomeric material.

4. The force measuring apparatus of claim 1 wherein said flat cavities are provided in peripheral regions of said main body only, said main body forming a platform symmetrically supported by said cavities and said force introduction means in peripheral regions of said platform.

5. The force measuring apparatus of claim 1 wherein said force introduction means are provided at their lower surfaces with projections for pointlike support of said force measuring apparatus.

6. A flat-spread force measuring apparatus comprising:
   a generally flat main body having an essentially plane top surface for receiving a load;
   at least one flat cavity extending in parallel to said top surface over a major part within said main body;
   essentially bubblefree elastomeric material contained in said cavity or cavities;
   one pressure sensor each arranged in contact with said elastomeric material in (each) said cavity;
   a thinned peripheral region at said top surface of said main body imparting a certain resiliency to an upper part of said main body located below said main surface and above said cavities; and
   evaluation means connected to said pressure sensor(s) for receiving electrical signals therefrom.

7. The force measuring apparatus of claim 6 wherein a plurality of cavities is provided in said main body separated from each other and a plurality of flat slots extends in parallel to said top surface below thereof and above said cavities said gaps being interrupted by posts formed of material of said main body and extending in vertical alignment to said pressure sensors to said top surface.

8. The force measuring apparatus of claim 6 wherein said gaps in a periphery of said main body are broadened toward said top surface for forming said thinned peripheral region of said main body.

9. The force measuring apparatus of claim 6 wherein said evaluation means are arranged in a compartment unitary to said main body.

10. The force measuring apparatus of claim 9 wherein said compartment is covered with a transparent plate permitting sight to an indicator provided on said evaluation means.

11. The force measuring apparatus of claim 6 wherein said main body is made of polymeric material containing filler material distributed therein.

12. The force measuring apparatus of claim 11 wherein reinforcing means are embedded in said polymeric material.

13. A flat spread force measuring device comprising:
   a flat base member;
   a flat load receiving member arranged in spaced relationship to said base member;
   elastomeric material interposed between opposing surfaces of said base member and said load receiving member and strongly adhered thereto;
   at least one pressure sensor in contact with said elastomeric material;
   an evaluation means electrically connected to said pressure sensors for combining electrical signals received therefrom and representing local force components transmitted from said load receiving member through said elastomeric material to said pressure sensors; and
   wherein said base member and said load receiving member are made of polymeric material containing filler material distributed therein.

14. The force measuring device of claim 13 wherein reinforcing means are embedded in said polymeric material.

15. A flat-spread force measuring device comprising:
a generally flat base member;
a generally flat load receiving member arranged in spaced relationship to said base member;
an essentially bubblefree elastomeric material interposed between said base member and said load receiving member and strongly adhered to opposing surfaces thereof;
a plurality of pressure sensors arranged in contact with said elastomeric material in distance to each other and distributed over the total area defined by said base member and said load receiving member; and
an evaluation means electrically connected to said pressure sensors for combining electrical signals received therefrom and representing local force components transmitted from said load receiving member through said elastomeric material to said pressure sensors.

16. The force measuring device of claim 15 wherein said base member and said load receiving member are integrally connected at least at their peripheries, leaving at least one flat cavity therebetween completely filled with said essentially bubblefree elastomeric material, said or each cavity having an opening for establishing a contact between said elastomeric material and a said pressure sensor associated with said cavity.

17. The force measuring apparatus of claim 15 wherein said housing is made of polymeric material containing filler material distributed therein.

18. A flat-spread force measuring apparatus comprising:
a generally flat housing having an interior bottom surface formed with a plurality of wedge-type ribs extending in parallel to each other in a first dimensional direction of said force measuring apparatus;
a wedge member arranged in said interior of said housing having a lower surface provided with wedge-type ribs complementary to those of said bottom surface of said interior of said housing and having a plane top surface opposing a lower surface of a plane top wall of said housing, gaps being formed between opposing surfaces of said ribs of said bottom surface of said interior of said housing and of said lower surface of said wedge member and between said lower surface of said top wall and said top surface of said wedge member;
elastomeric material filling main portions of said gaps with the exception of gap parts lying in marginal regions of said top surface of said wedge member and in regions adjacent to steep leading surfaces of said lower surface of said wedge member; and
at least one force measuring element mounted in said housing in engagement with a face surface of said wedge member which face surface extends laterally to a direction of movement of said wedge member upon load application on said top surface.

19. The force measuring apparatus of claim 18 wherein in spaces not filled with elastomeric material a synthetic foam material is provided.

20. The force measuring apparatus of claim 18 wherein said elastomeric material strongly adheres to said surfaces of said wedge member and said housing.

21. The force measuring apparatus of claim 18 wherein said at least one force measuring element comprises a cylindrical recess provided in said wall of said housing, a piston member inserted into said recess and forming a narrow gap between cylindrical surfaces of said recess and said piston member, elastomeric material filling said gap and a space defined by surfaces of said recess and an inner face surface of said piston member, and a pressure sensor mounted in said wall and in contact with said elastomeric material.

22. The force measuring apparatus of claim 21 wherein said piston member is integral with said wedge member.

23. The force measuring apparatus of claim 18 wherein said housing is made of polymeric material having filler material distributed therein.

24. The force measuring apparatus of claim 23 wherein reinforcing means are embedded in said polymeric material.

25. The force measuring apparatus of claim 18 wherein said top wall of said housing is a metal plate of relatively small thickness as compared with the overall height of said apparatus and wherein said metal plate is secured at least to opposing rims of said housing extending laterally to a direction of movement of said wedge member upon load application onto said top surface.

26. The force measuring apparatus of claim 18 wherein said force measuring element is arranged in a compartment unitary to said housing and covered by a transparent plate permitting sight on an indication means associated to said force measuring element.

27. The force measuring apparatus of claim 18 wherein said elastomeric material is provided between at least part of interior side surfaces and those side surfaces opposed thereto, of said wedge member extending in parallel to a direction of movement of said wedge member upon load application onto said top surface of said housing.

28. The force measuring apparatus of claim 18 wherein said at least one force measuring element is integrated into said wall of said housing.

* * * * *